(12) United States Patent
Gagnon et al.

(10) Patent No.: US 6,388,257 B1
(45) Date of Patent: May 14, 2002

(54) STEPPED ASYMMETRIC SAMPLING SCHEME FOR TRANSMISSION RADIATION CORRECTED GAMMA CAMERAS

(75) Inventors: Daniel Gagnon, Twinsburg; Chi-Hua Tung, Aurora, both of OH (US)

(73) Assignee: Philips Medical Systems (Cleveland ), Inc., Highland Heights, OH (US)

( * ) Notice: Subject to any disclaimer, the term of this patent is extended or adjusted under 35 U.S.C. 154(b) by 0 days.

(21) Appl. No.: 09/522,736

(22) Filed: Mar. 10, 2000

(51) Int. Cl.$^7$ ............................................... G01T 1/166
(52) U.S. Cl. ......................... 250/363.04; 250/363.03; 600/463
(58) Field of Search ................ 250/363.03, 363.04, 250/363.05; 600/407, 425, 436

(56) References Cited

U.S. PATENT DOCUMENTS

| | | | |
|---|---|---|---|
| 5,270,923 A | * 12/1993 | King et al. ............... | 382/131 |
| 5,600,145 A | 2/1997 | Plummer | |
| 5,638,817 A | 6/1997 | Morgan et al. | |
| 5,717,212 A | 2/1998 | Fulton et al. | |
| 5,923,038 A | * 7/1999 | DiFilippo et al. ...... | 250/363.04 |

OTHER PUBLICATIONS

"Attenuation Correction in PET Using Single Photon Transmission Measurement", DeKemp, et al., Med. Phys. 21 (6), Jun. 1994, pp. 771–778.

"IRIX™ Variable Angle, Triple–Detector Nuclear Imaging System", Picker Advertising Brochure, Jul. 1999.
"BEACON™ Non–Uniform Attenuation Correction" Picker Advertising Brochure, Aug. 1999.
"AXIS™ Variable Angle, Dual–Detector Nuclear Imaging System" Picker Advertising Brochure, Jul. 1999.

* cited by examiner

*Primary Examiner*—Constantine Hannaher
(74) *Attorney, Agent, or Firm*—Fay, Sharpe, Fagan, Minnich & McKee, LLP

(57) ABSTRACT

An asymmetric sampling scheme for use with a nuclear medicine gamma camera facilitates collection of a full set of higher resolution emission data and lower resolution transmission data with one complete 360° rotation of the gantry. The gantry (16) contains a plurality of radiation detectors (20a–20c) and at least one adjustably mounted radiation source (30a). During a scan, the gantry (16) is incrementally rotated about a subject receiving aperture (18) by a predetermined step size throughout a first 180° of a rotation ($P_1$, . . . , $P_6$). The gantry (16) is then rotated about the subject receiving aperture (18) by one-half the predetermined step size ($P_7$ or $P_8$). The gantry (16) is then incrementally rotated about the subject receiving aperture (18) by the predetermined step size throughout the remaining 180° of the scan ($P_8$, . . . , $P_{12}$). Emission data collected during the second half of the scan ($P_8$, . . . , $P_{12}$) is interleaved into the data from the first half of the scan. Such sampling reduces overall scan time by cutting the number of steps approximately in half, therefore, eliminating 50% of the dead time while the gantry rotates and comes to rest.

15 Claims, 4 Drawing Sheets

STEPPED ASYMMETRIC SAMPLING SCHEME FOR TRANSMISSION RADIATION CORRECTED GAMMA CAMERAS

BACKGROUND OF THE INVENTION

The present invention relates to the arts of nuclear medicine and diagnostic imaging. It finds particular application in conjunction with gamma cameras and will be described with particular reference thereto. It is to be appreciated that the present invention is applicable to positron emission tomography (PET), whole body nuclear scans, and/or other like applications.

Diagnostic nuclear imaging is used to study a radionuclide distribution in a subject. Typically, one or more radiopharmaceuticals or radioisotopes are injected into a subject. The radiopharmaceuticals are commonly injected into the subject's blood stream for imaging the circulatory system or for imaging specific organs which absorb the injected radiopharmaceuticals. Gamma or scintillation camera detector heads, typically including collimators, are placed adjacent to a surface of the subject to monitor and record emitted radiation. Often, the detector heads are rotated or indexed around the subject to monitor the emitted radiation from a plurality of directions. In single photon emission computed tomography (SPECT), emission radiation is detected by a single collimated detector. In positron emission tomography (PET), data collection is limited to emission radiation that is detected concurrently by a pair of oppositely disposed heads. The monitored radiation data from the multiplicity of directions is reconstructed into a three dimensional image representation of the radiopharmaceutical distribution within the subject.

One of the problems with these imaging techniques is that photon absorption and scatter by portions of the subject or subject support between the emitting radionuclide and the detector heads distort the resultant image. One solution for compensating for photon attenuation is to assume uniform photon attenuation throughout the subject. That is, the subject is assumed to be completely homogeneous in terms of radiation attenuation with no distinction made for bone, soft tissue, lung, etc. This enables attenuation estimates to be made based on the surface contour of the subject. However, human subjects do not cause uniform radiation attenuation, especially in the chest.

In order to obtain more accurate SPECT and PET radiation attenuation measurements, a direct, transmission radiation emission measurement is made using transmission computed tomography techniques. In this technique, radiation is projected from a radiation source through the subject. Attenuated radiation rays are received by detectors at the opposite side. The source and detectors are rotated to collect transmission data concurrently or sequentially with the emission data through a multiplicity of angles. This transmission data is reconstructed into an image representation using conventional tomography algorithms. Regional radiation attenuation properties of the subject and the support, which are derived from the transmission computed tomography image, are used to correct or compensate for radiation attenuation in the emission data.

PET measurements are typically made at incrementally stepped locations. One difficulty resides in optimizing the sampling of both the PET and SPECT emission data, and the transmission data so as to reduce overall scan time. Typically, PET emission data is acquired with greater resolution than transmission data (i.e., approximately 2–4° per step for collecting emission data versus about 5–8° per step for collecting transmission data). The total time to perform such a scan is composed of the time to actually acquire data at each angular orientation and the time to mechanically move the gantry from one angular orientation to another and stabilize it at the new orientation.

In a PET scan, the data is typically collected at angular increments of the desired resolution over the first 180° of revolution. For 3° of resolution, the data is collected at 60 steps each 3° apart. When using transmission radiation in a fan beam pattern and a 360° reconstruction algorithm, transmission data can be collected at 30 additional steps each 6° apart (and the corresponding emission data discarded) or both can be collected at 60 additional steps each 3° apart. After each indexing, there is a significant wait time while the physical position of the heads stabilizes. A wait time for stabilization of only 2–4 seconds per step adds 4–8 minutes to a 120 step scan.

The present invention contemplates a new and improved data sampling technique for gamma cameras which collect emission data and transmission data simultaneously which overcomes the above-referenced problems and others.

SUMMARY OF THE INVENTION

In accordance with one aspect of the present invention, a method of diagnostic imaging using a nuclear medicine gamma camera includes placing a subject in a subject receiving aperture and injecting the subject with a radiopharmaceutical. At least one radiation source and a plurality of radiation detectors are positioned about the subject receiving aperture such that the radiation source is across the subject receiving aperture from a corresponding radiation detector. Radiation from the radiation source is directed toward the corresponding radiation detector. The radiation source and radiation detectors are incrementally rotated about the subject receiving aperture by a predetermined step size throughout a first 180° of rotation about the subject receiving aperture. The radiation source and radiation detectors are then offset by one-half of the predetermined step size and incrementally rotated about the subject receiving aperture by the predetermined step size throughout the remaining 180° of one complete rotation about the subject receiving aperture. Radiation emitted by the injected radiopharmaceutical and transmitted by the radiation source is detected by the plurality of radiation detectors at each angular orientation corresponding to each step of incremental rotation about the subject receiving aperture. Emission projection data and transmission projection data are generated and reconstructed into a volumetric image representation.

In accordance with another aspect of the present invention, a positron emission tomographic camera includes a rotating gantry which defines a subject receiving aperture. A plurality of radiation detectors heads are movably attached to the rotating gantry such that the detector heads rotate about the subject receiving aperture with rotation of the rotating gantry. A rotational drive steps the plurality of detector heads around the subject receiving aperture in even steps where the steps in one half rotation are offset from the steps in the opposite half rotation by one half of the even step. At least one radiation source is mounted to at least one detector head such that transmission radiation from the radiation source is directed toward and received by a corresponding detector head positioned across the subject receiving aperture from the radiation source. An angular position sensor senses the angular position of the gantry and each detector head attached thereto as the gantry rotates about the subject receiving aperture. A reconstruction processor reconstructs the emission and transmission data into a volumetric emission image representation.

In accordance with another aspect of the present invention, a method of sampling transmission radiation data and emission radiation data for use in diagnostic imaging includes selecting a rotation increment for effective emission data imaging resolution. A radiation source and radiation detectors are incrementally rotated about a subject receiving aperture by a predetermined step size over a first 180° of one complete rotation about the subject receiving aperture. Further, the radiation source and radiation detectors are incrementally rotated about the subject receiving aperture by the predetermined step size over a remaining second 180° of one complete rotation offset by a half step relative to the first 180° of rotation. Radiation emitted by the radiopharmaceutical and the radiation transmitted by the radiation source are detected at each stepped angular orientation corresponding to each incremental rotation about the subject receiving aperture.

In accordance with a more limited aspect of the present invention, the sampling method includes interleaving emission radiation data detected during the second 180° incremental rotation with emission radiation data detected during the first 180° incremental rotation.

One advantage of the present invention is that it reduces gantry dead time.

Another advantage of the present invention is that it reduces by approximately one-half the number of steps for emission and transmission data acquisition as conventional sampling methods.

Another advantage of the present invention is that it provides greater resolution for PET emission than is required for transmission data.

Other benefits and advantages of the present invention will become apparent to those skilled in the art upon a reading and understanding of the preferred embodiment.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
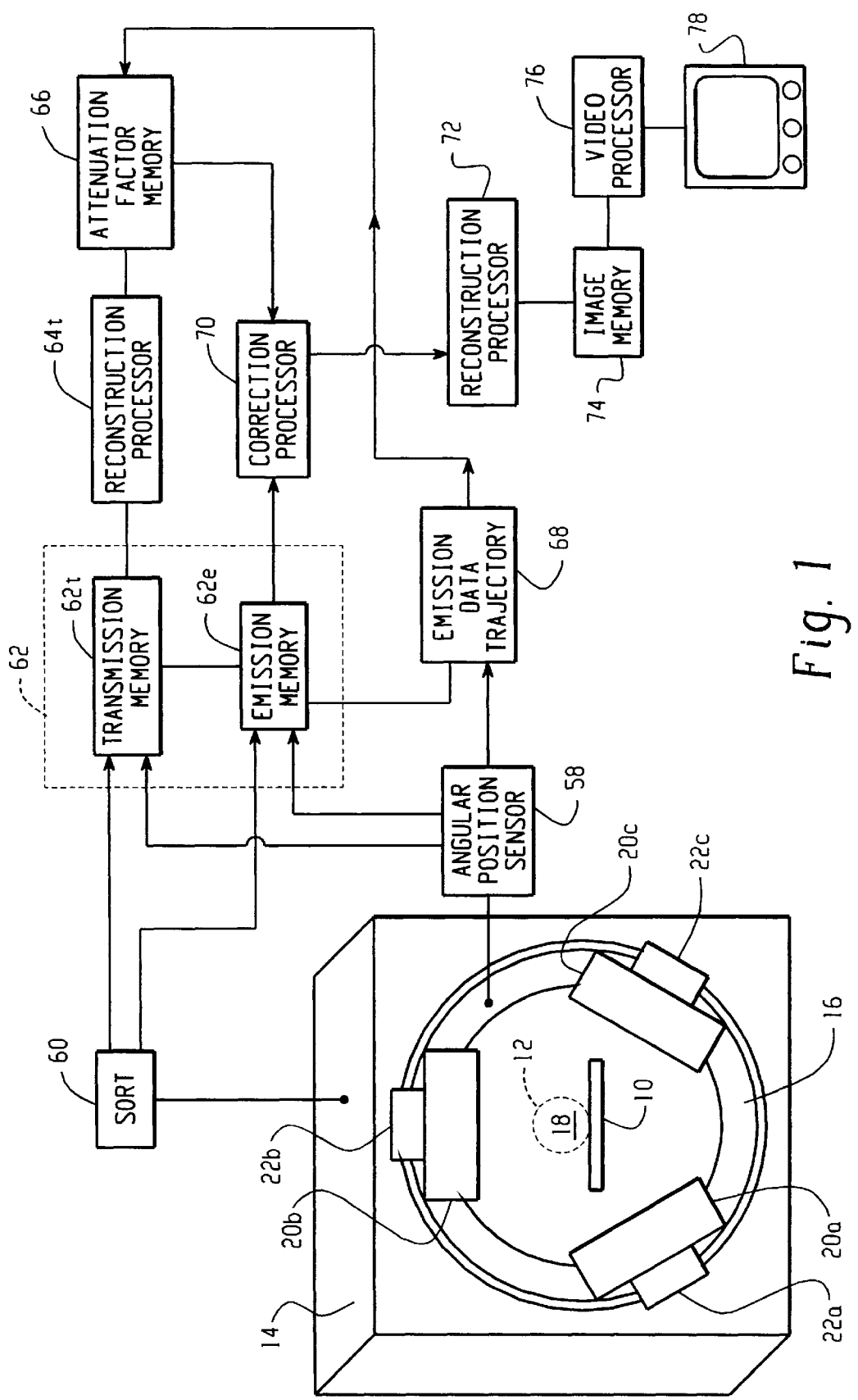
FIG. 1 is a diagrammatic illustration of a nuclear medicine gamma camera in accordance with aspects of the present invention.

With reference to FIG. 1, a diagnostic imaging apparatus includes a subject support 10, such as a table or couch, which supports a subject 12 (shown in FIG. 2) being examined and/or imaged. The subject 12 is injected with one or more radiopharmaceuticals or radioisotopes such that emission radiation is emitted therefrom. Optionally, the subject support 10 is selectively height adjustable so as to center the subject 12 at a desired height. A first or stationary gantry 14 rotatably supports a rotating gantry 16. The rotating gantry 16 defines a subject receiving aperture 18. In a preferred embodiment, the first gantry 14 is advanced toward and/or retracted from the subject support 10 so as to selectively position regions of interest of the subject 12 within the subject receiving aperture 18. Alternately, the subject support 10 is advanced and/or retracted to achieve the desired positioning of the subject 12 within the subject receiving aperture 18.

Detector heads 20a, 20b, 20c are movably mounted to the rotating gantry 16. The detector heads 20a–20c also rotate about the subject receiving aperture 18 (and the subject 12 when received) with the rotation of the rotating gantry 16. The detector heads 20a–20c are radially and circumferentially adjustable to vary their spacing on the rotating gantry 16, as for example, in the manner disclosed in U.S. Pat. No. 5,717,212. Separate translation devices 22a–22c, such as motors and drive assemblies, independently translate the detector heads radially and laterally in directions tangential to the subject receiving aperture 18 along linear tracks or other appropriate guides. Preferably, a single motor and drive assembly controls movement of all the detector heads 20a–20c individually and/or as a unit.

Each of the detector heads 20a–20c has a radiation receiving face facing the subject receiving aperture 18. Each head includes a scintillation crystal, such as a large doped sodium iodide crystal, that emits a flash of light or photons in response to incident radiation. An array of photomultiplier tubes receive the light and convert it into electrical signals. A resolver circuit resolves the x, y-coordinates of each flash of light and the energy of the incident radiation. That is to say, radiation strikes the scintillation crystal causing the scintillation crystal to scintillate, i.e., emit light photons in response to the radiation. The photons are received by the photomultiplier tubes and their relative outputs of the photomultiplier tubes are processed and corrected to generate an output signal indicative of (i) a position coordinate on the detector head at which each radiation event is received, and (ii) an energy of each event. The energy is used to differentiate between various types of radiation such as multiple emission radiation sources, stray and secondary emission radiation, transmission radiation, and to eliminate noise. In SPECT imaging, a projection image representation is defined by the radiation data received at each coordinate. In PET imaging, the detector head outputs are monitored for coincident radiation. From the position and orientation of the heads and the location on the faces at which the coincident radiation was received, a ray between the peak detection points is calculated. This ray defines a line along which the radiation event occurred. The radiation data is then reconstructed into a volumetric image representation of the region of interest.

For SPECT imaging, the detector heads 20a–20c include mechanical collimators 22a, 22b, 22c, respectively, removably mounted on the radiation receiving faces of the detector heads 20a–20c. The collimators preferably include an array or grid of lead vanes which restrict the detector heads 20a–20c from receiving radiation not traveling along selected rays in accordance with the data type being collected.

Figure 2:
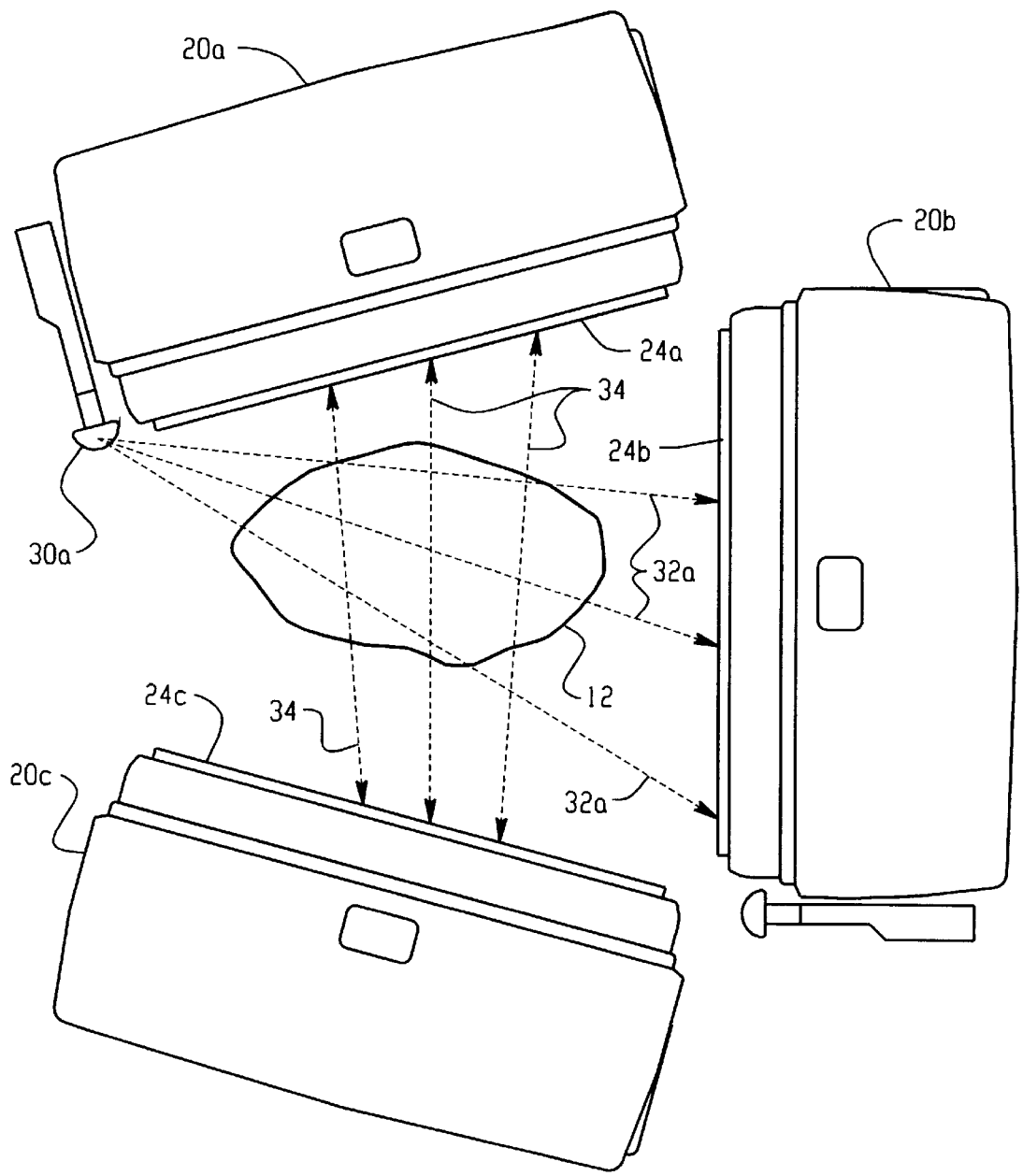
FIG. 2 is a diagrammatic illustration of a preferred orientation of heads in a three head nuclear medicine gamma camera in accordance with the present invention.
Figure 3:
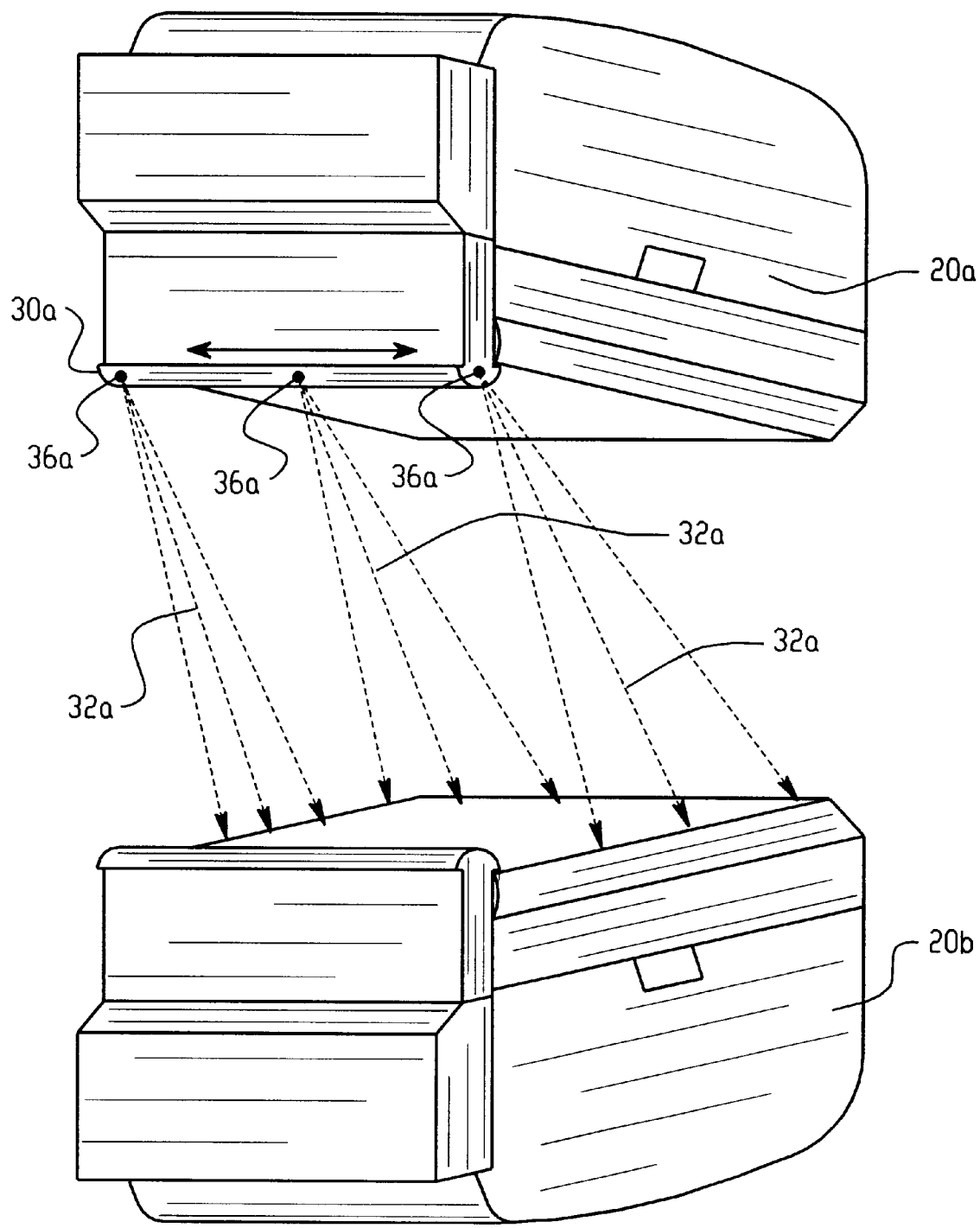
FIG. 3 is a perspective view of a preferred orientation of two heads of a nuclear medicine gamma camera in accordance with the present invention; and, FIG. 4 is a diagrammatic illustration of an asymmetric sampling scheme in accordance with the present invention.

With reference to FIG. 2 and FIG. 3 and continuing reference to FIG. 1, at least one radiation source 30a is mounted to at least one detector head 20a such that transmission radiation (represented by the arrows 32a) from the radiation source 30a is directed toward and received by the corresponding detector head 20b positioned across the subject receiving aperture from the radiation source 30a. It is to be appreciated that radiation sources may be mounted to two or all three detector heads. In a preferred embodiment, a collimator is employed at least on the detector head 20a which receives the transmission radiation 32a. That is to say, the collimator 22b restricts the detector head 20b, (in the embodiment of FIG. 2) from receiving those portions of transmission radiation not traveling along direct rays in parallel planes normal to the radiation receiving face of the detector head. Alternately, other collimation geometries are employed for different applications and radiation sources, such as a point source. Additional collimation may take place at the source.

FIG. 2 illustrates a three-head embodiment, including a first detector head 20a, a second detector head 20b, and a third detector head 20c arranged on the rotating gantry 16 spaced from one another around the subject receiving aperture 18. A first radiation source 30a is mounted to the first detector head 20a such that transmission radiation 32a therefrom is directed toward and received by the second detector head 20b. Preferably, for positron emission tomography (PET), two detector heads 20a, 20c are used for coincidence detection of emitted radiation (represented by arrows 34), while the third detector head 20b is dedicated to receiving transmitted radiation from the radiation source 30a.

In one embodiment, the radiation source 30a contains a radioactive point source 36a which adjustably mounted inside a shielded steel cylinder which is sealed at the ends. As shown in FIG. 3, the radiation source 30a rasters longitudinally across the field of view at each angular orientation of the rotatably gantry. The steel cylinder is adjustably mounted onto the corresponding detector head through a pivoting arm mechanism. Alternately, the radiation source 30a is a bar source, flat rectangular source, disk source, flood source, tube or vessel filled with radionuclides, or active radiation generators such as x-ray tubes.

With reference again to FIG. 1, as the gantry 16 rotates about the subject receiving aperture 18, an angular position sensor 58 senses or indexes the angular position of the rotatable gantry, and therefore the angular positions of the respective detector heads 20a–20c, when each set of data is collected. The discrete index of angular positions recorded by the angular position sensor 58 is used for indexing the recorded mission and transmission data. In one embodiment, the angular position sensor is an optical sensor which senses the position of the gantry by projecting light, such as a laser beam, through a particulate outer ring on the gantry and receiving the projected light. It is to be appreciated that conventional mechanical means, such as rotating gears, are also employed for detecting angular orientation of the rotatable gantry.

Running an imaging operation includes a reconstruction process for emission and transmission data. The reconstruction technique changes according to the type of radiation collected and the types of collimators used (i.e., fan, cone, parallel beam, and/or other modes). Emission radiation from the subject 12 and transmission radiation 32a from the radiation source 30a are received by the detector heads 20a–20c, and emission projection data and transmission projection data are generated. The emission data normally contains inaccuracies caused by varying absorption characteristics of the subject's anatomy. A sorter 60 sorts the emission projection data and transmission projection data such as on the basis of their relative energies or the detector head which originated the data. The data is stored in a projection view memory 62, more specifically in a corresponding emission data memory 62e and transmission data memory 62t. A reconstruction processor 64t uses a fan beam reconstruction algorithm to reconstruct the transmission data into a transmission image representation or volume of attenuation factors stored in a memory 66. Each voxel value stored in the memory 66 is indicative of attenuation of tissue in a corresponding location within the subject 12.

An emission data trajectory processor 68 determines the trajectory of each emission data ray relative to the volume image representation in memory 66 and causes the attenuation values along the ray to be retrieved. Those skilled in the art will appreciate that in PET imaging, a projection at a given angular orientation and its 180 degrees-opposed counterpart are substantially equivalent. The nature of PET data and the appropriate sampling scheme for acquiring such data will be described below in greater detail.

An emission data correction means 70 corrects each emission data in accordance with the attenuation factors determined from the transmission data. More specifically, for each ray along which emission data is received, the emission data trajectory processor 68 calculates a corresponding ray through the transmission attenuation factors stored in the memory 66. Each ray of the emission data is then weighted or corrected by an emission data correction processor 70 in accordance with the attenuation factors. The corrected emission data are reconstructed by an emission radiation reconstruction processor 72 to generate a three-dimensional emission image representation that is stored in a volumetric emission image memory 74. A video processor 76 withdraws selected portions of the data from the image memory 74 to generate corresponding human-readable displays on a video monitor 78. Typical displays include reprojections, selected slices or planes, surface renderings, and the like.

Figure 4:
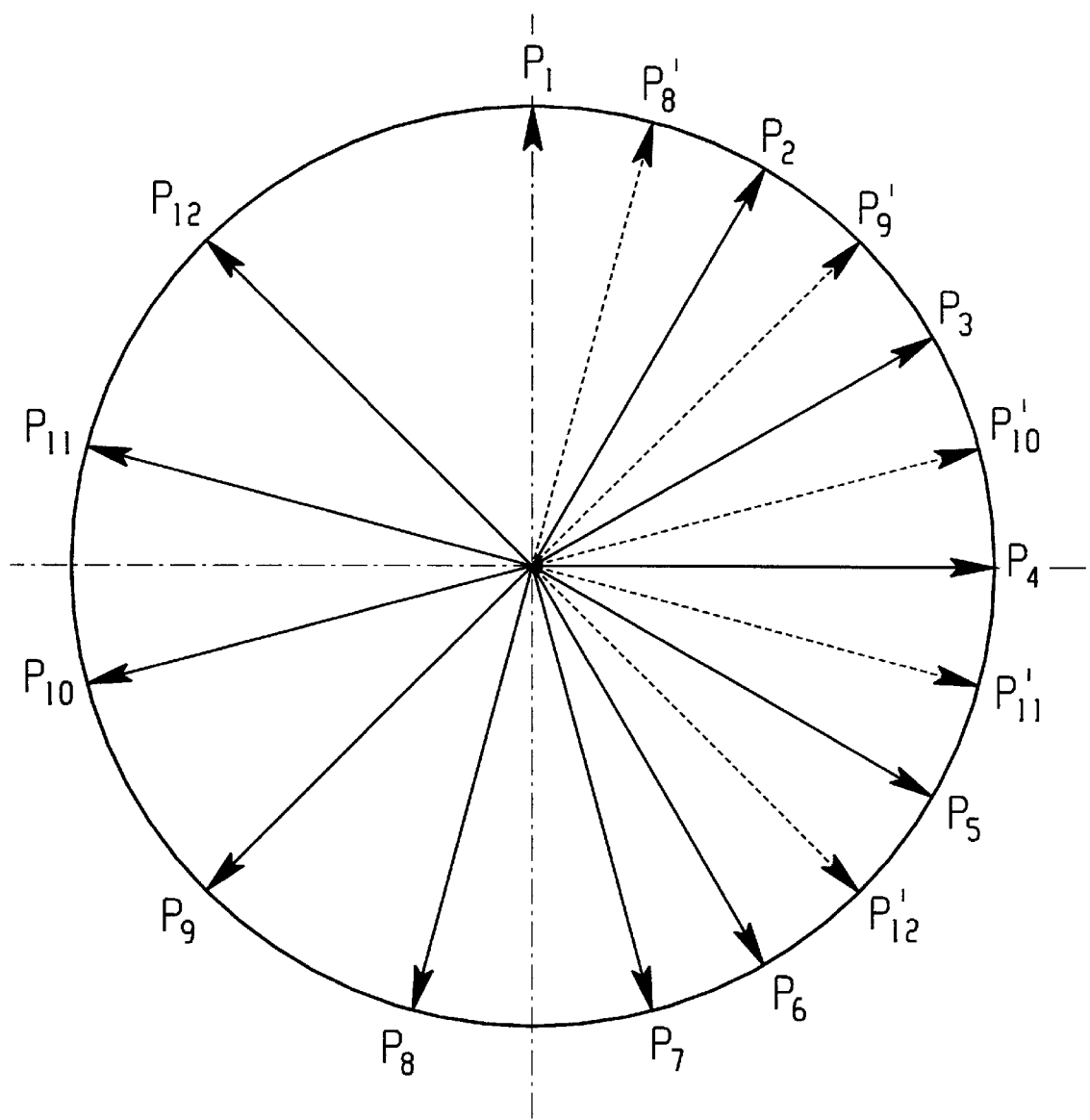

With reference to FIG. 4 and continuing reference to FIG. 1, the present invention utilizes an asymmetric sampling scheme which facilitates simultaneous or sequential collection of a complete set of emission and transmission data with one complete 360° rotation of the gantry about the subject. Artisans will appreciate that in coincidence detection for PET imaging, whenever two detector heads detect a radiation event concurrently, the event is mathematically assumed to have occurred on a ray 34 between the two detection points. In other words, a projection and its 180°-opposed counterpart are substantially equivalent. It will be appreciated that because the emission data is symmetric, the detector heads need only be rotated 180° for a complete sampling of emission data. To generate a complete fan beam data set, the transmission radiation data is collected over more than 180°, in the preferred embodiment over 360°. Optionally, the transmission data can be collected over 180° plus the fan angle.

For a given PET imaging sequence, emission data typically is typically sampled with a finer sampling (i.e., less angular rotation of the gantry per sampling step) than transmission data. In a preferred embodiment, the emission data has a 3° per step resolution, while the transmission data has a 6° per step resolution. Artisans will appreciate that because the transmission source is on the same gantry as the coincidence detector heads, it will have the same sampling as the emission data collection. For the purposes of illustration, FIG. 4 provides a sampling scheme for collection of both emission and transmission data during one complete 360° rotation around the subject. In this illustration, emission data resolution of 15° per step and transmission data resolution of 30° per step have been chosen.

In FIG. 4, each ray $P_1, \ldots, P_{12}$ represents an angular orientation at which an emission projection and transmission projection are sampled. For the first 180° of gantry rotation, emission data and transmission data are collected as described above at 30° intervals or steps $P_1, P_2, \ldots, P_6$. At the 180° point in the scan, the gantry is stepped at a single step of one-half the previous step size, 15° in this illustration. For the remaining second half of the scan, the gantry is stepped at the original step size of 30° $P_7, P_8, \ldots, P_{12}$. At this point, a complete transmission 360° fan beam data set exists with the desired 30° resolution. However, the emission data set over the first 180° is incomplete because it is sampled at 30° per step instead of the desired 15° per step. Because the emission data is symmetric, it is to be appreciated that the emission data collected during the second 180° of the scan $P_7, P_8, \ldots, P_{12}$ is projected or interleaved into the first 180° $P_7', P_8', \ldots, P_{12}'$, as shown. Therefore, the emission data set is provided by $P_1, P_8', P_2, P_9', P_3, P_{10}', P_4, P_{11}', P_5, P_{12}', P_6, P_{13}'$. It is to be appreciated that this sampling scheme may be extended to situations where the desired transmission resolution is 1/n of the desired emission resolution. In such a case, data is sampled at steps corresponding to the transmission data resolution, using n 180° gantry rotations, with a step of 1/n at each 180° interval. For example, a scan having an emission data resolution of 15° per step and a transmission data resolution of 45° per step can be performed in 3 180° rotations having 45° steps, with a single one-third step of 15° after each 180° of rotation. Such an embodiment reduces artifacts due to patient motion and facilitates reconstruction of an image after 33%, 66% or 100% of the total acquisition time. Each additional 180° of rotation provides additional radiation counts and additional view angles, but each reconstructed image is complete. In the preferred embodiment, after one complete rotation, an operator collects a 180°, 3°/step emission data set and a 360° 6°/step transmission data set. Artisans will appreciate that the overall effect of this sampling scheme is to save approximately 50% of gantry dead time by requiring approximately one-half the number of steps. In addition, for PET and SPECT applications, the existence of two complete and semi-redundant acquisitions may provide means for estimating patient motion during a scan. It is to be further appreciated that the above sampling may be applied to SPECT applications by interleaving two 360° scans. This can be accomplished by performing two 180° rotations on a 180° opposed detector configuration, rotating by one half-step, and performing another 180° rotation.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A method of diagnostic imaging using a nuclear medicine gamma camera, the method comprising:
   (a) placing a subject in a subject receiving aperture;
   (b) injecting the subject with a radiopharmaceutical;
   (c) positioning at least one radiation source and a plurality of radiation detectors about the subject receiving aperture such that the radiation source is across the subject receiving aperture from a corresponding radiation detector;
   (d) directing radiation from the radiation source toward the corresponding radiation detector positioned across the subject receiving aperture;
   (e) incrementally rotating the radiation source and radiation detectors about the subject receiving aperture by a predetermined step size throughout a first 180° of rotation about the subject receiving aperture;
   (f) offsetting the radiation source and radiation detectors about the subject receiving aperture by one-half of the predetermined step size;
   (g) incrementally rotating the radiation source and radiation detectors about the subject receiving aperture by the predetermined step size throughout the remaining second 180° of one complete rotation about the subject receiving aperture;
   (h) detecting radiation emitted by the injected radiopharmaceutical and transmitted by the radiation source using the plurality of radiation detectors at each angular orientation corresponding to each step of incremental rotation about the subject receiving aperture;
   (i) generating emission projection data and transmission projection data from the detected emission and transmission radiation; and
   (j) reconstructing the emission and transmission projection data into a volumetric image representation.

2. The method according to claim 1, wherein the reconstructing step further comprises:
   reconstructing the transmission projection data into an attenuation image representation.

3. The method according to claim 2, wherein the reconstructing step further comprises:
   interleaving the emission data from the second 180° incremental rotation with the emission data from the first 180° incremental rotation.

4. The method according to claim 3, wherein the reconstructing step further comprises:
   correcting the emission data based on the attenuation image representation.

5. The method according to claim 4, wherein the correcting step includes:
   calculating attenuation factors from the attenuation image representation, said attenuation factors corresponding to each ray along which emission data is received.

6. The method according to claim 4, wherein the reconstructing step further comprises:
   reconstructing the corrected emission data into a volumetric emission image representation.

7. The method according to claim 6, wherein:
   the predetermined step size corresponds to the transmission data resolution; and,
   one-half of the predetermined step size corresponds to the desired emission data resolution.

8. The method according to claim 4, wherein the step of detecting the emitted radiation includes detecting only radiation events detected coincidently by at least two detectors.

9. A positron emission tomographic camera comprising:
   a rotating gantry which defines a subject receiving aperture;
   a rotational drive for stepping the detector heads around the patient receiving aperture in even steps with the steps in one half rotation offset from steps in an opposite half rotation offset by one half of the even step;
   a plurality of radiation detector heads movably attached to the rotating gantry, said detector heads rotating about the subject receiving aperture with rotation of the rotating gantry;

at least one radiation source mounted to at least one detector head such that transmission radiation from the radiation source is directed toward and received by a corresponding detector head positioned across the subject receiving aperture from the radiation source;

an angular position sensor which senses the angular position of the gantry and each detector head attached thereto as the gantry rotates about the subject receiving aperture; and a reconstruction processor which reconstructs the emission and transmission data into a volumetric emission image representation.

10. The positron emission tomographic camera according to claim 9, further comprising:

an indexer for interleaving emission data detected in the one and opposite half rotations into a continuous data set.

11. The positron emission tomographic camera according to claim 10, wherein the reconstruction processor includes:

a correction processor for correcting emission data based on collected and reconstructed transmission data to account for attenuation effects on the emission data.

12. A method of sampling transmission radiation data and emission radiation data from a radiopharmaceutical injection for use in diagnostic imaging, said method comprising:

(a) selecting a rotation increment for effective emission data imaging resolution;

(b) incrementally rotating a radiation source and radiation detectors about a subject receiving aperture by a predetermined step size over a first 180° of one complete rotation about the subject receiving aperture;

(c) incrementally rotating the radiation source and radiation detectors about the subject receiving aperture by the predetermined step size over a remaining second 180° of one complete rotation about the subject receiving aperture offset by a half step relative to the first 180° of rotation; and (d) detecting radiation emitted by the radiopharmaceutical and the radiation transmitted by the radiation source at each stepped angular orientation corresponding to each incremental rotation about the subject receiving aperture.

13. The method according to claim 12, wherein the predetermined step size is twice the selected rotation increment.

14. The method according to claim 13, wherein the predetermined step size corresponds to transmission data resolution.

15. The method according to claim 12, further including:

(e) interleaving emission radiation data detected during the second 180° incremental rotation with emission radiation data detected during the first 180° incremental rotation.

* * * * *